(12) United States Patent
Siegel

(10) Patent No.: US 7,398,993 B2
(45) Date of Patent: Jul. 15, 2008

(54) AIRBAG ARRANGEMENT FOR A MOTOR VEHICLE

(75) Inventor: Wolfgang Siegel, Sontheim/Brenz (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/535,143

(22) Filed: Sep. 26, 2006

(65) Prior Publication Data

US 2007/0069512 A1  Mar. 29, 2007

(30) Foreign Application Priority Data

Sep. 27, 2005  (DE) .................. 10 2005 047 703

(51) Int. Cl.
*B60R 21/21* (2006.01)
*B60R 21/213* (2006.01)

(52) U.S. Cl. ................. 280/730.2; 280/743.1

(58) Field of Classification Search ........... 280/729, 280/730.1, 730.2, 743.1
See application file for complete search history.

(56) References Cited

U.S. PATENT DOCUMENTS

| | | | | |
|---|---|---|---|---|
| 5,405,166 A | * | 4/1995 | Rogerson | 280/739 |
| 5,452,914 A | * | 9/1995 | Hirai | 280/743.1 |
| 5,470,106 A | * | 11/1995 | Nishimura et al. | 280/743.1 |
| 5,492,362 A | * | 2/1996 | Lehman et al. | 280/739 |
| 5,498,030 A | * | 3/1996 | Hill et al. | 280/743.1 |
| 6,056,316 A | * | 5/2000 | Yamaji et al. | 280/730.2 |
| 6,439,606 B2 | * | 8/2002 | Okada et al. | 280/743.1 |
| 6,749,216 B2 | * | 6/2004 | Tanase et al. | 280/730.2 |
| 6,848,714 B2 | * | 2/2005 | Varcus | 280/743.1 |
| 6,962,364 B2 | * | 11/2005 | Ju et al. | 280/730.2 |
| 2003/0218324 A1 | * | 11/2003 | Ju et al. | 280/743.1 |
| 2004/0104563 A1 | | 6/2004 | Fischer | |
| 2005/0057025 A1 | * | 3/2005 | Hofmann | 280/730.2 |

FOREIGN PATENT DOCUMENTS

| | | |
|---|---|---|
| DE | 201 05 734 U1 | 10/2001 |
| DE | 202 16 339 U1. | 4/2003 |
| DE | 202 18 550 U1 | 5/2003 |
| DE | 202 15 541 U1 | 3/2004 |
| EP | 0 962 363 A1 | 12/1999 |
| GB | 2225291 A * | 5/1990 |

* cited by examiner

*Primary Examiner*—Christopher Ellis
*Assistant Examiner*—Joseph Rocca
(74) *Attorney, Agent, or Firm*—Foley & Lardner LLP

(57) ABSTRACT

An airbag can include a covering that surrounds an interior space that can be filled with gas, a gas-conducting pipe which is stretched longitudinally along a direction of extent, and a contact region of the covering that surrounds the inflow opening and encloses the gas-conducting pipe in a sealing manner along a circumferential direction of the gas-conducting pipe that encircles the direction of extent. A protective layer of the covering can be arranged, at least in some sections in the interior space of the covering, with respect to the gas-conducting pipe so that damage to the covering during filling of the interior space of the covering with hot gas can be prevented by the protective layer. At least one fastening region of the protective layer, via which the protective layer can be connected to the covering, can be connected to the contact region of the covering.

20 Claims, 7 Drawing Sheets

AIRBAG ARRANGEMENT FOR A MOTOR VEHICLE

BACKGROUND

The present application relates to an airbag arrangement for a motor vehicle. In an airbag arrangement for a motor vehicle, at least one airbag is provided which can be inflated to protect a person in or on the motor vehicle. The at least one airbag has a covering which encloses an interior space that can be filled with gas. This covering can be filled with gas through an inflow opening by means of a gas-conducting pipe, which is formed such that it is stretched longitudinally along a direction of extent, to inflate the airbag, with the gas-conducting pipe being enclosed by a contact region of the covering that borders the inflow opening along a circumferential direction of the gas-conducting pipe that runs annularly about the extent of the gas-conducting pipe.

Furthermore, the covering of the airbag has an additional protective layer that is of planar design and is arranged, at least in some sections in the interior space of the covering, with respect to the gas-conducting pipe so that damage to the covering by filling of the interior space of the covering with hot gas is prevented by the protective layer. In this case, the protective layer is connected to the covering of the airbag via one or more fastening regions of the protective layer. Additional protective layers of this type are necessary, particularly in the case of gas-conducting pipes which are of relatively short design (along the direction that the pipe extends in), which means that a gas released by a gas generator cannot be sufficiently cooled when introduced into the covering of the airbag by the (short) gas-conducting pipe and that there is therefore a risk of the covering being damaged, i.e. burned, by the hot gas introduced into the covering, causing the airbag to no longer have a protective function.

In the case of conventional airbag arrangements, the individual airbag layers are composed of textile sheet-like structures which are connected by seams to form the airbag covering which can be filled with gas, whereby the additional protective layers are generally fixed to the covering via seam connections.

In the case of gas-tight airbags, i.e., in the case of airbags which are optimized with respect to their service lives by the use of gas-tight airbag layers (for example, suitably coated airbag layers) and correspondingly sealed connections, there is a difficulty that each seam fastening the protective layer to the covering, which is filled with gas when in use, has to be sealed by a seal made from a suitable sealant. Strips of silicon are usually applied to the seam to accomplish this. However, this causes a disadvantage in that the surface coating of the airbag is increased by the application of additional silicone seals, causing the airbag to take up a larger volume than a comparable airbag without these additional seals, such as when the airbag is folded.

SUMMARY

According to a disclosed embodiment, an airbag for a motor vehicle that can be inflated to protect a vehicle occupant comprises a covering that forms an interior space that can be filled with gas, wherein the covering comprises an inflow opening; a contact region that is configured to contact a gas-conducting pipe that conducts gas through the inflow opening and into the interior space to inflate the airbag, wherein the contact region surrounds the inflow opening and encloses the gas-conducting pipe in a sealing manner along a circumferential direction of the gas-conducting pipe; and a protective layer that is arranged to protect the covering from hot gas that fills the interior space of the covering, wherein the protective layer comprises at least one fastening region that connects the protective layer to the covering, wherein the at least one fastening region is connected to the contact region.

BRIEF DESCRIPTION OF THE DRAWINGS

The illustrated features and advantages of embodiments described herein are to be clarified with reference to the following descriptions of the figures.

DETAILED DESCRIPTION

Figure 1:
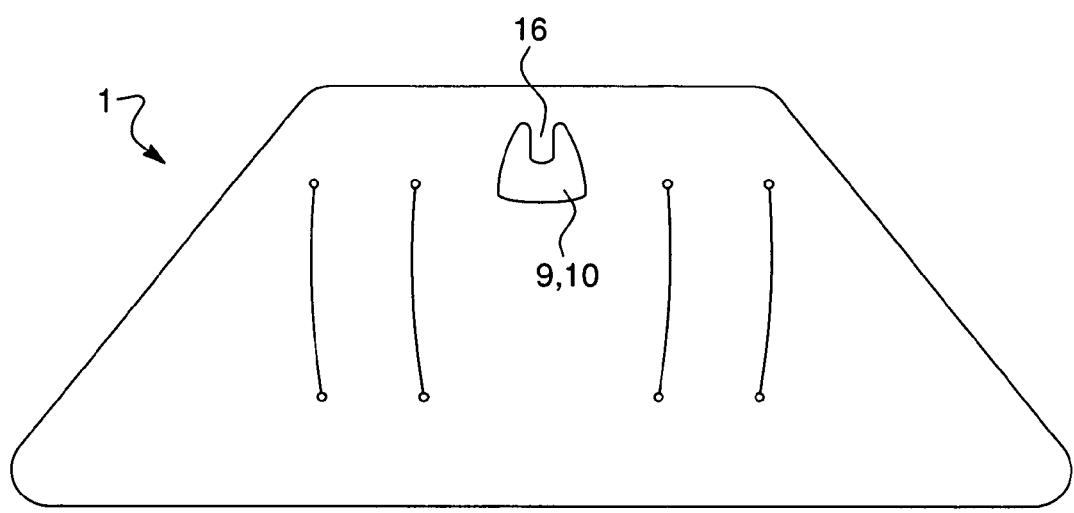
FIG. 1 shows a plan view of a curtain airbag, according to an embodiment.

An object of at least one disclosed embodiment is to provide an airbag arrangement for an occupant restraint device, in which an airbag is equipped with an additional protective layer for protecting the covering of the airbag so that the surface coating of the airbag is as small as possible.

Accordingly, an object of at least one disclosed embodiment is to provide an airbag arrangement wherein one fastening region of a protective layer is fastened to a contact region of the covering.

According to an embodiment, a protective layer can be fastened to a covering of an airbag so that additional sealing of a connection between the protective layer and the covering is not required. That is to say, the protective layer can be fastened to the covering at a distance from that part of the covering which is filled with gas. More particularly, the protective layer can be fastened to the covering at a distance from the contact region of the covering. Such arrangements advantageously address the problem of airbags with an increased thickness and folded volume due to protective layers.

Airbag arrangements can include a covering with a contact region and, for sealing the enclosure of the gas-conducting pipe, a sealing region which encloses the gas-conducting pipe in a sealing manner in a circumferential direction of the gas-conducting pipe. In such arrangements, however, the sealing region does not achieve absolute tightness. Furthermore, the sealing region can also serve to engage around the gas-conducting pipe so that the covering of the airbag is fixed with respect to the gas-conducting pipe.

According to an embodiment, a sealing enclosure of a sealing region can be achieved by a matching shape of the contact region or with the aid of a ring-like element that is placed in the circumferential direction of the gas-conducting pipe around the contact region and the gas-conducting pipe situated below it and presses the contact region of the covering against the gas-conducting pipe.

A gas-tight part of a covering of an airbag can be separated from a gas-permeable part of the covering, or a part which is not additionally sealed, via a sealing region, with a fastening region being connected to the covering via the gas-permeable part of the covering.

According to an embodiment, a sealing region is arranged at a distance from an inflow opening along a direction that the gas-conducting pipe extends in. In this case, a fastening region of a protective layer can be fastened to a contact region along the direction the pipe extends in between the inflow opening and the sealing region. More particularly, the protective layer can be fixed via its fastening region to a free end of the contact region which lies opposite the sealing region along the direction that the pipe extends in. Such arrangements are advantageous because a fastening region of a protective layer is significantly spaced apart from a gas-filled part of a covering, so that the fastening region of the protective layer can be fixed to a contact region of the covering by a simple seam without compromising a tightness of the covering.

A fastening region can be arranged transversely with respect to a contact region and a direction that a gas-conducting pipe extends in, so that a protective layer can be guided in a simple manner along the direction the pipe extends in and into a part of the covering which is filled with gas, with the protective layer running transversely with respect to the direction of extent between the gas-conducting pipe and the sealing region. It is conceivable in this case for a sealant to be arranged on the gas-conducting pipe, with the sealant encircling the gas-conducting pipe in a circumferential direction and pressing it against the contact region and the protective layer, so that, when the airbag is inflated, gas cannot escape out of the covering of the airbag along the gas-conducting pipe.

According to an embodiment, a fastening region is furthermore provided and positioned to fasten a covering to a motor vehicle part. In the case of an airbag, which can be inflated between a window of a side door of the motor vehicle and an occupant, a contact region of the covering and therefore a gas-conducting pipe can be fixed to a B-pillar of the motor vehicle via the fastening region. On the one fastening region there can be formed at least one continuous recess into which a fastening device can be introduced. Fastening devices such as, for example, a screw or other fastening devices known in the art can be inserted into a motor vehicle part in order to fasten the one fastening region.

According to an embodiment, a plurality of fastening regions is provided via which a protective layer is connected to a covering. The plurality of fastening regions for the protective layer can be fastened to the covering, so as to be located precisely to an inside of the covering, which faces an interior space of the covering, by adhesive connections which do not impair the tightness of the covering.

The contact region can be formed integrally with the covering, whereby the covering can be formed from a first and a second airbag layer. The airbag layers can be, for example, two congruent airbag layers which can be joined together, for example by means of an encircling seam, along two outer edges of the two airbag layers to form a covering which can be filled with gas.

A first and second airbag layer can be of gas-tight design, according to an embodiment. For this purpose, for example, conventional textile nonwoven fabrics or knitted fabrics used for airbag layers can be coated in a suitable manner. For example, such fabrics can be coated with a silicone or gas-tight (i.e. gas-impermeable) material. According to another example, flexible sheet-like structures can be used. For a gas-tight connection of airbag layers of this type, use can be made, for example, of a conventional seam using a seal, for example in the form of a strip of silicon, which can be applied on or along the seam. It is also conceivable to adhesively bond or weld the airbag layers to each other.

The two airbag layers can be connected to each other along two encircling outer edges of the two airbag layers. For this purpose, the first and the second airbag layer can be formed congruently.

According to an embodiment, a first and second airbag layer can each have a cutout, the two cutouts being formed congruently and being surrounded by a respective inner encircling edge of the first or second airbag layer. The two airbag layers, in order to form the covering, can be connected to each other along the inner encircling edges so that the two sections rest congruently on each other.

A first and second edge region can protrude along a direction of extent both from a first airbag layer and from a second airbag layer, the two edge regions being connected to each other to form the contact region of the covering. The first and the second edge region can each have two mutually opposite edges which run along the direction of extent, the two edge regions being arranged congruently with respect to each other and being connected to each other along the edges contacting against each other to form a contact region.

According to an embodiment, it is provided that mutually opposite edges of a first edge region form parts of an outer encircling edge of a first airbag layer, and that mutually opposite edges of a second edge region form parts of an outer encircling edge of a second airbag layer.

According to another embodiment, mutually opposite edges of a first edge region form sections of an inner encircling edge of a first airbag layer, and mutually opposite edges of a second edge region form sections of an inner encircling edge of a second airbag layer.

A protective layer can have a protective region leading away from a fastening region and can be arranged transversely, with respect to a direction that a gas-conducting pipe extends in, between a contact region of the covering and the gas-conducting pipe.

Furthermore, a protective region of the protective layer can be fixed to an inside of the covering, which faces the interior space of the covering, by an adhesive connection. An adhesive connection of this type can be composed of, for example, a silicone that can be applied to the inside or to the protective region in order to adhesively bond the protective layer to the inside of the covering. For example, the adhesive connection can be arranged in a spotwise manner so that adhesive is applied to limited areas.

A protective region can be designed so that it widens transversely along a direction that a gas-conducting pipe extends in. That is to say, the greater a distance from an outflow opening of the gas-conducting pipe, the greater is the width or extent of the protective region in a transverse direction, with respect to the direction that the gas-conducting pipe extends in. In this manner, account is taken of the diffusion of hot gas, and the covering is protected from hot gases at a distance from the outflow opening.

According to an embodiment, a protective region is always arranged at a distance from a connection which connects a first airbag layer to a second airbag layer in order to form a covering of the airbag. That is to say, the protective region is arranged entirely within the interior space of the covering or of a gas-tight part of the covering and is fixed there to an inside of the covering with the aid of adhesive connections which do not impair the tightness of the covering.

The connection which connects a first and second airbag layer to each other can be designed as an outer seam which runs along two outer encircling edges of the airbag layers.

Furthermore, in the case of a covering formed by two airbag layers that have a recess which is formed by cutouts, resting one each other, the airbag layers can be connected to each other via their inner edges encircling the cutouts. More particularly, the airbag layers can be connected via an inner seam running along the inner edges.

According to an embodiment, a connection between airbag layers, designed as an inner or outer seam, can be sealed off at a distance from a fastening region by an inner or outer seal, for example made of a silicone, running along the seam. That is to say, a region of a connection of the two airbag layers via which the fastening region of the protective layer is fastened to the contact region of the covering by the connection is not sealed.

A fastening region can be fastened to mutually opposite edges of a first and second edge region of a covering by a connection connecting the airbag layers to each other.

Embodiments of the present invention will be described below with reference to the drawings.

FIG. 1 shows a plan view of an airbag 1, according to an embodiment. The airbag 1 includes cutouts 9, 10 and a contact region 16 that serves to receive a gas-conducting pipe, as will be described in further detail.

Figure 2:
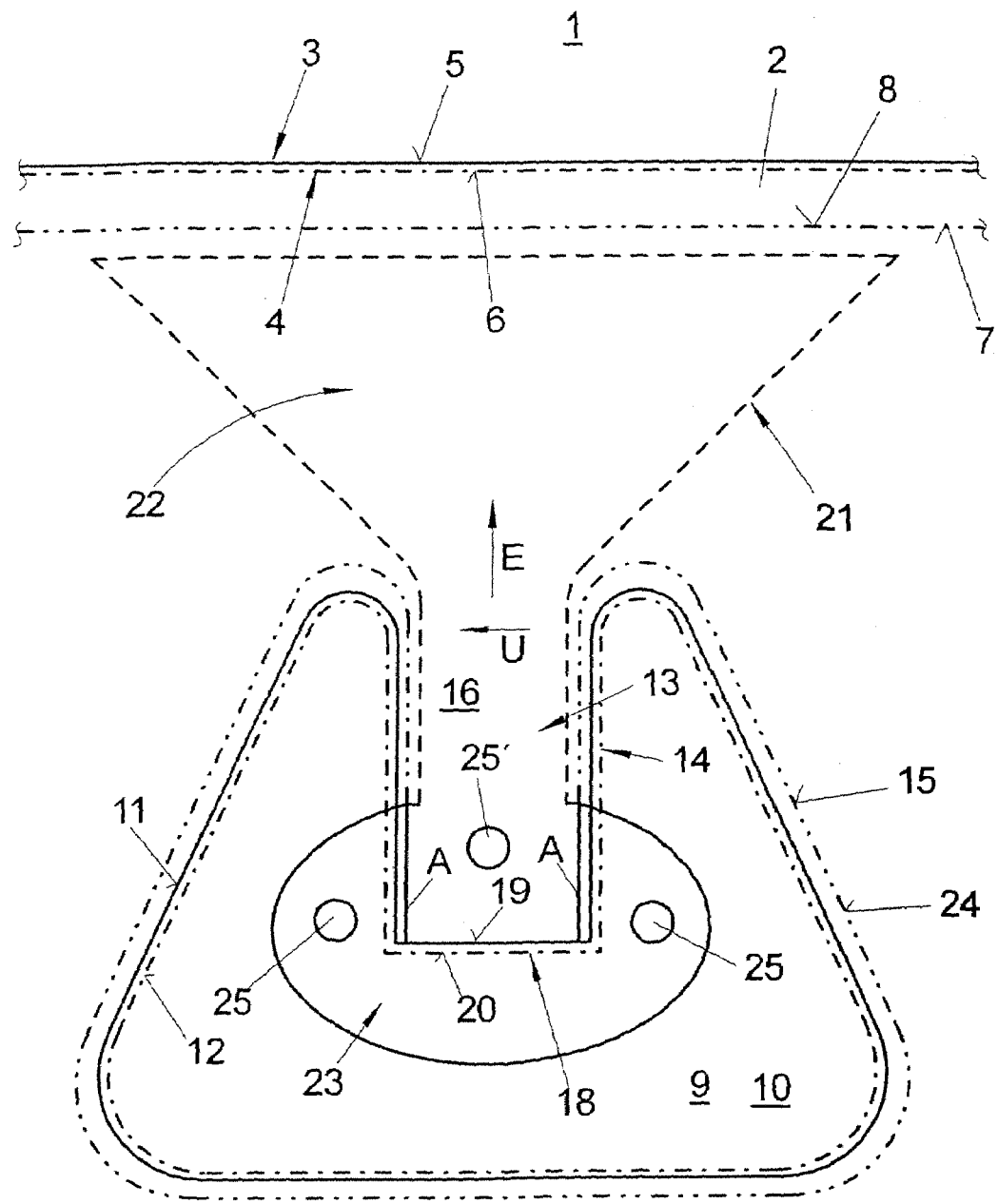
FIG. 2 shows a schematic plan view, by way of a cutout, of a curtain airbag with an additional protective layer.
Figure 3:
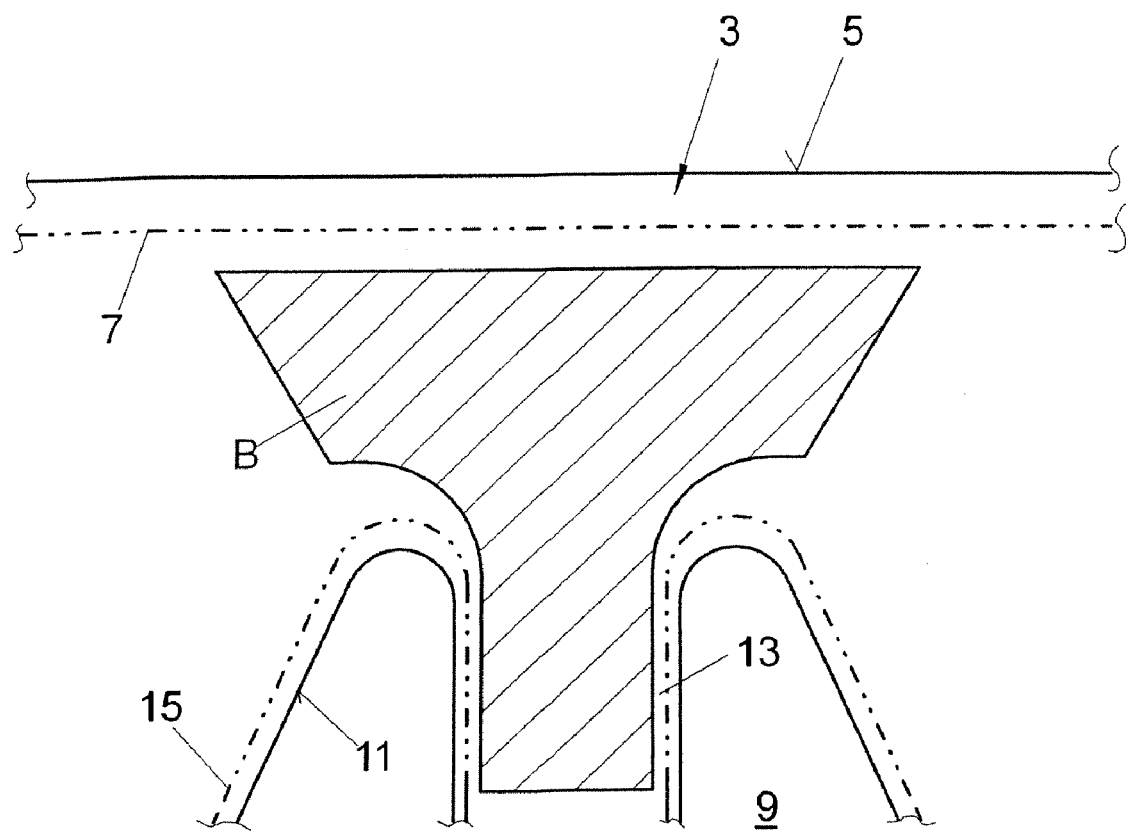
FIG. 3 shows a further schematic plan view, by way of a cutout, of a curtain airbag of the type shown in FIG. 2, with an additional protective layer.

FIG. 2 shows in conjunction with FIG. 3 a schematic plan view, by way of a cutout, of an exemplary uninflated airbag 1 of a side airbag module, with the airbag being arranged in a fold-free manner in a plane of extent coinciding with the plane of the paper.

The airbag 1 can include a covering 2 which is formed from a first and a second airbag layer 3, 4 which can be of planar design and composed of a nonwoven fabric or knitted fabric with a gas-tight coating. For this purpose, the two airbag layers 3, 4 can be arranged congruently on each other in the plane of their extent and connected to each other along their outer encircling edges 5, 6 by a connection in the form of an outer seam 7.

So that as little gas as possible can escape through interconnected encircling edge regions of the two airbag layers 3, 4 and through the seam holes formed on the two airbag layers 3, 4 on account of the outer seam 7, the outer seam 7 can be sealed by an outer seal 8 extending along the outer seam 7. An outer seal 8 of this type can be composed, for example, of a silicone.

Apart from the two encircling outer edges 5, 6 along which the two airbag layers 3, 4 can be connected to each other, the first and the second airbag layers 3, 4 can each have a cutout 9, 10, with each of the two cutouts 9, 10 being bordered by an inner encircling edge 11, 12 of the respective airbag layer 3, 4. The two airbag layers can be connected to each other along these two inner encircling edges 11, 12 so that the edges 11, 12 of the two airbag layers 3, 4 are arranged congruently on each other.

The cutouts 9, 10 of the first and second airbag layer 3, 4 can have an essentially U-shaped design which can be formed in each case by a first or second edge region 13 or 14 which is connected integrally to the airbag layers 3 or 4 and protrudes into the cutout 9 or 10 in a direction of extent E lying in the plane of the page of FIG. 2.

When the airbag 1 is fitted in a motor vehicle, the direction of extent E runs, for example, essentially transversely with respect to an outer edge R of the airbag 1, which extends along a roof strut of the motor vehicle.

The airbag layers 3, 4 of the covering 2 can be connected to each other along their two inner encircling edges 11, 12 via a connection in the form of an inner seam 15 which encircles the cutouts 9, 10 along the inner edges 11, 12. In this case, the first and the second edge regions 13, 14 can be connected to each other along their edges (which constitute parts of the inner encircling edges 11, 12) which are mutually opposite one another in a transverse direction with respect to the direction of extent E, thereby forming a contact region 16 of the covering 2. The contact region 16 serves to receive a gas-conducting pipe 17 (not shown in FIGS. 2 and 3) with which gas, which can be released by a gas generator, can be conducted into the covering 2 of the airbag 1 to inflate the airbag 1.

An inflow opening 18 of the covering 2 of the airbag 1, through which the gas-conducting pipe 17 can be introduced into the contact region 16, can be formed in a simple manner by the two edge regions 13, 14 of the airbag layers 3, 4 being open at their two free ends 19, 20, i.e. not being connected by the inner seam 15.

To protect the airbag layers 3, 4 from hot gas, an additional protective layer 21 of planar design can be placed between the two airbag layers 3, 4, with a protective region 22 of the protective layer 21 extending along the plane of extent of the airbag layers 3, 4 between the two airbag layers 3, 4. For example, the protective region 22 can be arranged along the contact region 16 between one of the two edge regions 13, 14 forming the contact region 16 and the gas-conducting pipe 17.

According to an embodiment, when the airbag 1 is fitted, the contact region 16 protrudes from the plane of extent of the deployed airbag 1 in a direction of extent E so that an outflow opening of the gas-conducting pipe 17 faces the protective region 22 of the protective layer 21 in a direction of extent E. Such an arrangement advantageously permits the use of an individual (single-sided) protective layer 21 to sufficiently protect the covering 2 of the airbag 1.

It is also conceivable to provide a plurality of protective layers 21 which surround the gas-conducting pipe 17 in a plane oriented perpendicularly with respect to the direction of extent E of the gas-conducting pipe 17 so that the protective regions 22 thereof are grouped in an overall funnel-shaped manner around the outflow opening of the gas-conducting pipe 17. For example, a protective layer 21 can be arranged on each airbag layer 3, 4, or a protective layer 21 that forms a single overall funnel shape can be arranged in a contact region 16.

A protective region 22 of the protective layer 21 can be fixed to a first airbag layer 3 at a distance from the contact region 16 by an adhesive connection formed in a spotwise manner (for example by means of a silicone), with the protective region 22 tapering along the direction of extent E toward the contact region 16 so that the protective region 22 is always arranged at a distance from the outer seam 7 or inner seam 15 by an encircling edge.

At a free end of a contact region 16, a fastening region 23 of a protective layer 21 can be connected integrally to the protective region 22 of the protective layer 21, with the fastening region 23 being connected on both sides of the inflow opening 18 via an inner seam 15 to two edge regions 13, 14, which form the contact region 16, of the two airbag layers 3, 4. In this case, that section A of the inner seam 15 by which the fastening region 23 is connected to the contact region 16 is not, in contrast to the remaining sections of the inner seam 15, sealed by an inner seal 24 (which can be formed with a silicone, for example), because this is not necessary in order to ensure the tightness of the covering 2 of the airbag 1.

Furthermore, a fastening region 23 can be guided out of the contact region 16 of the covering 2 at the inflow opening 18 of the covering 2 to protrude from a free end of the contact region 16 along the plane of extent of the covering 2. This protruding region of the fastening region 23 can be provided with recesses 25 in the form of circular holes by which the fastening region 23 and therefore the contact region 16 of the covering 2 of the airbag 1 (and also the gas-conducting pipe 17 situated therein) can be fastened to a motor vehicle part, for example to a B-pillar. Furthermore, recesses 25' can also be provided on the contact region 16, via which the gas-conducting pipe 17 can additionally be fixed to the contact region 16.

It is conceivable, in order to produce an airbag 1 of this type, to first arrange a first airbag layer 3 according to FIG. 3 in a fold-free manner in a plane, then to fix a protective layer to the first airbag layer 3 by spotwise adhesive fixings in the region B of the first airbag layer 3 in order to then place the second airbag layer 4 and to connect it to the first airbag layer 3 via seams 7 and 15 along the lines shown in the example of FIG. 3. In this case, as described previously, a fastening region 23 of the protective layer 21 can be arranged outside that part of the covering 2 which can be filled with gas, so that, firstly, a seam connection between the fastening region 23 of the protective layer 21 and the covering 2 does not have to be additionally sealed and, secondly, additional sealing measures within the covering 2 are also not necessary.

Figure 4:
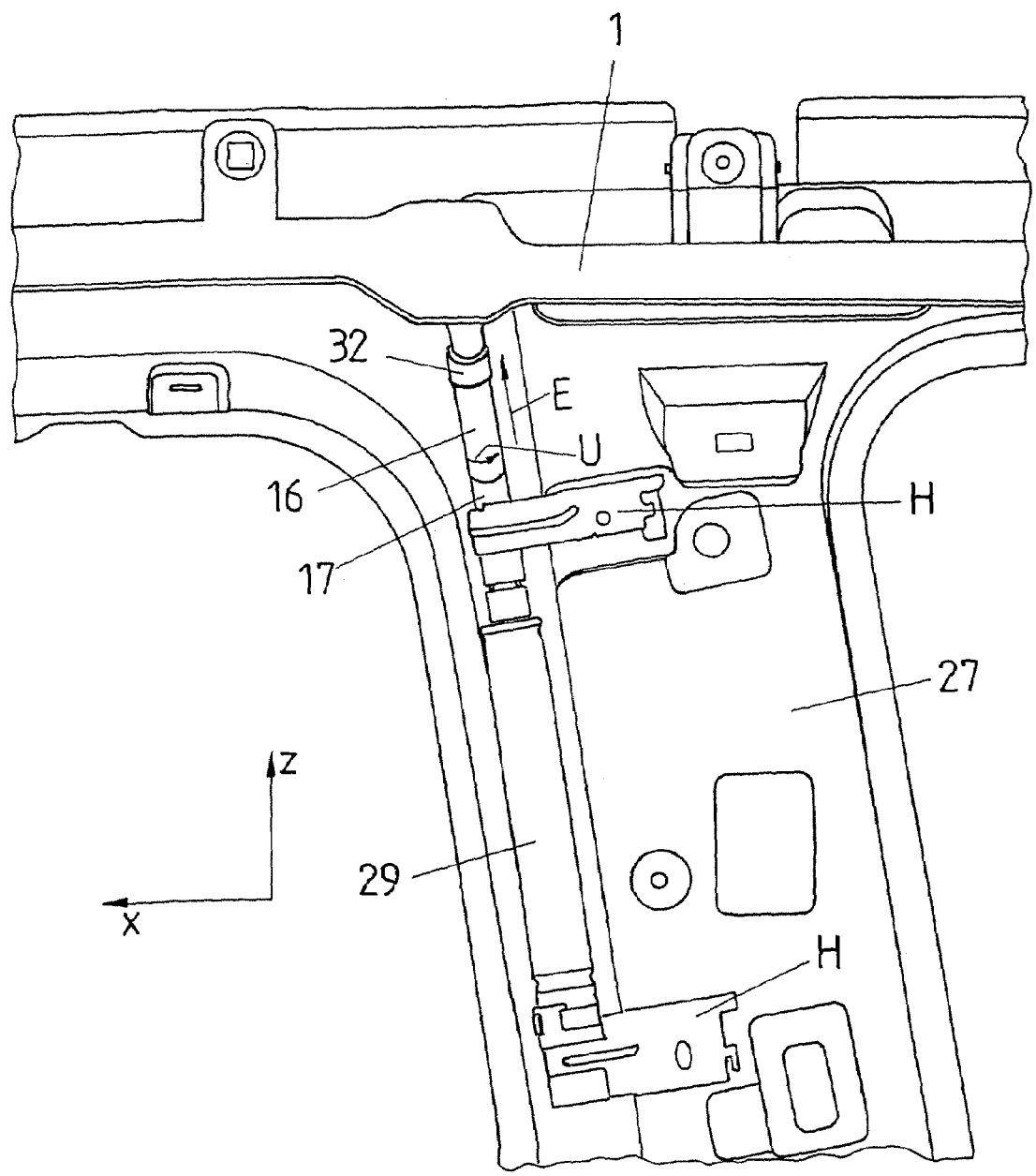
FIG. 4 shows a perspective view of an airbag arrangement according to an embodiment.
Figure 5:
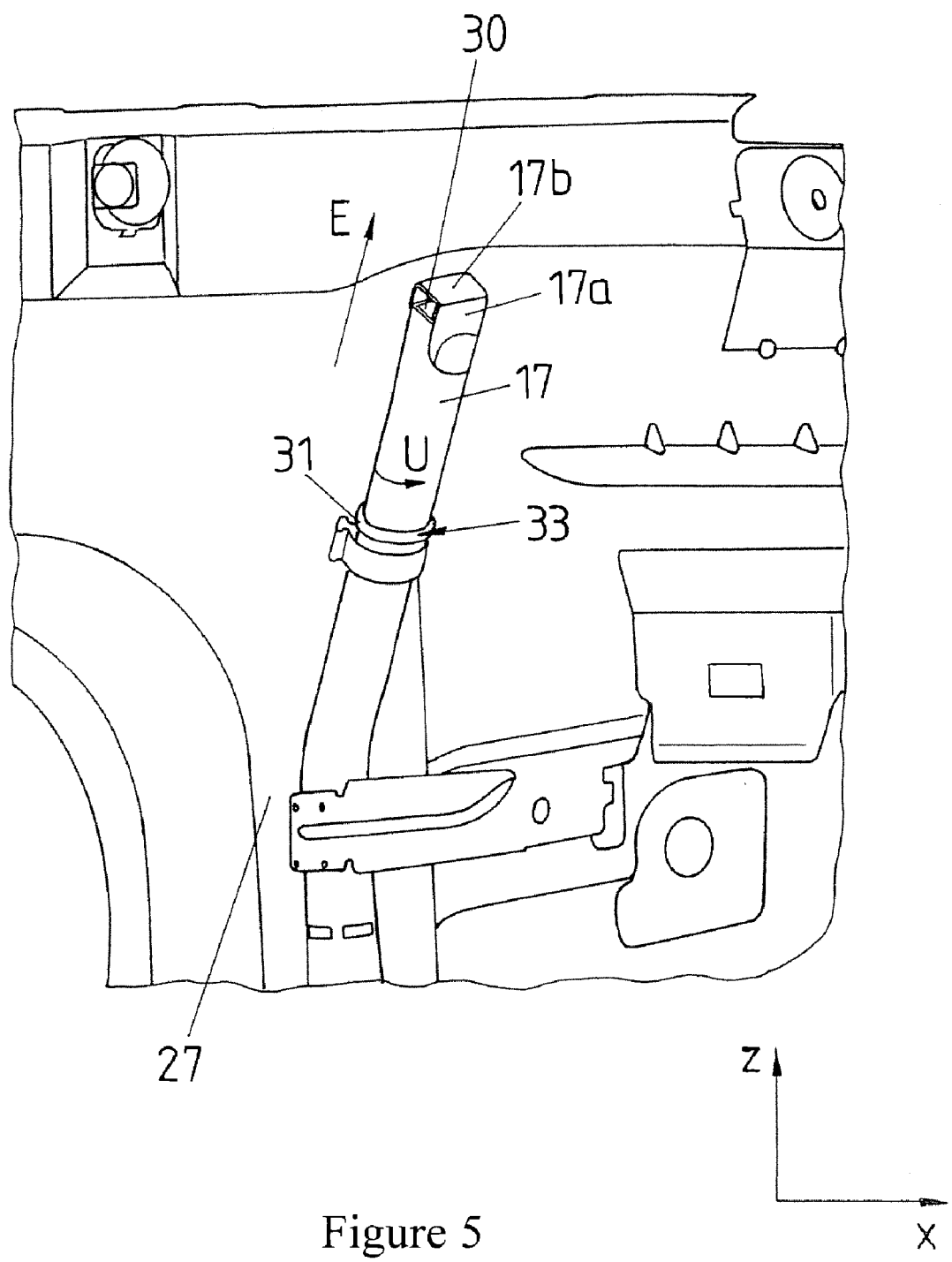
FIG. 5 shows a detail of the airbag arrangement shown in FIG. 4.
Figure 6:
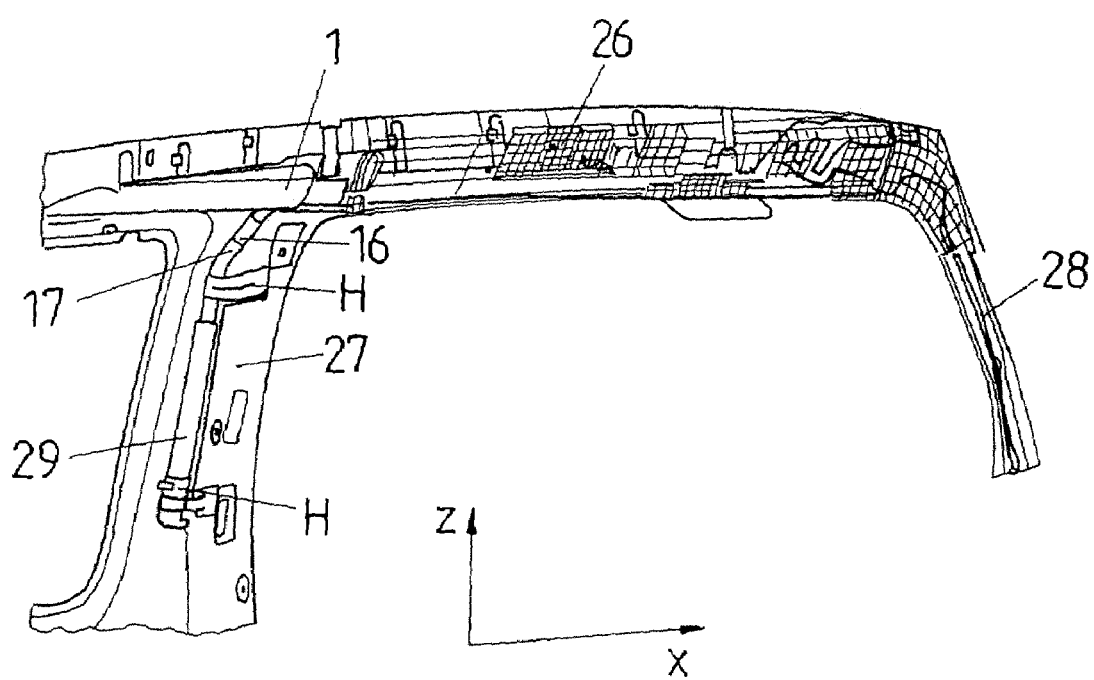
FIG. 6 shows a further perspective view of an airbag arrangement of the type shown in FIG. 4 and FIG. 5.
Figure 7:
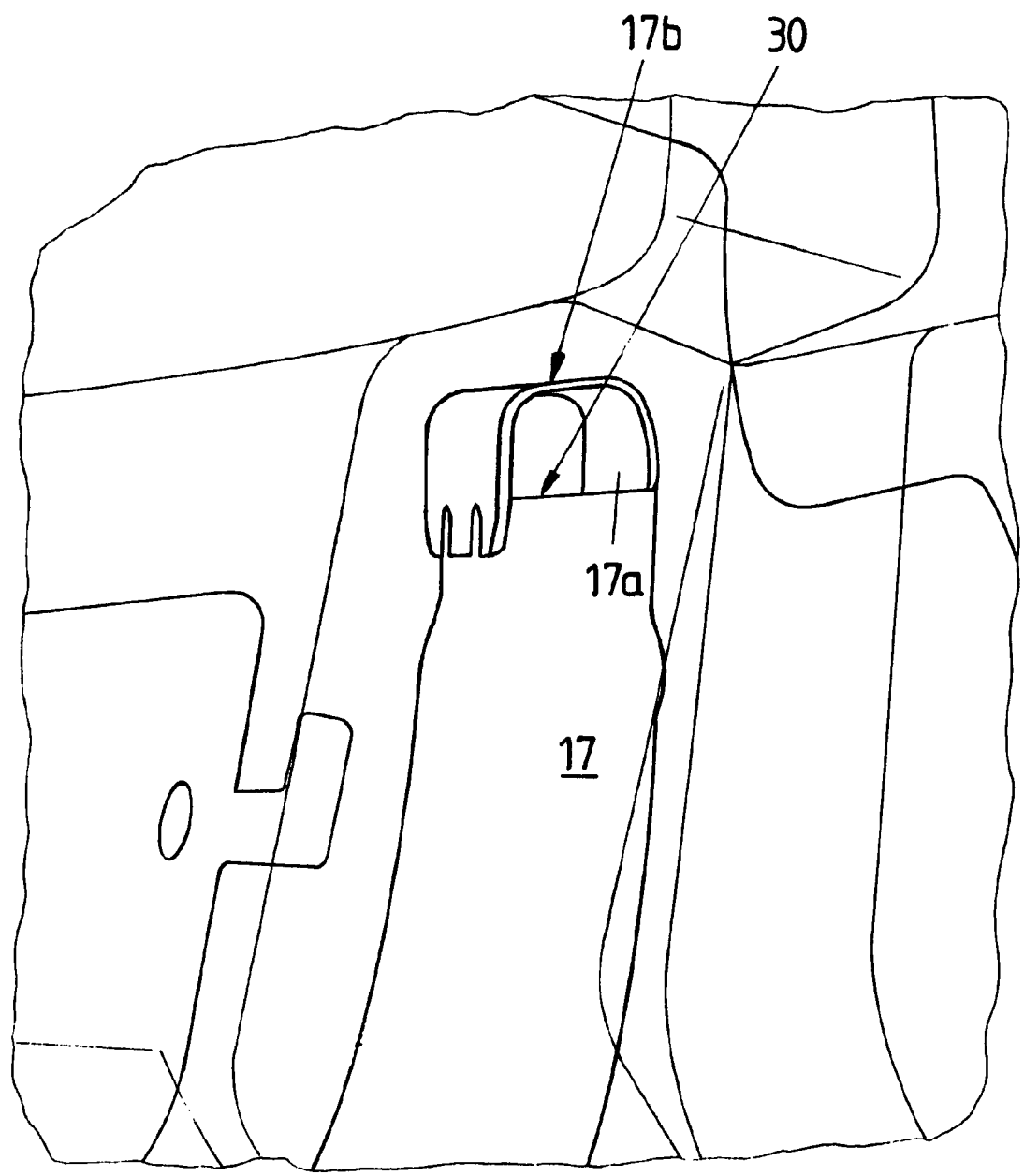
FIG. 7 shows a further perspective view of the detail shown in FIG. 5 of an airbag arrangement according to an embodiment.

FIG. 4 shows in conjunction with FIGS. 5 to 7 a perspective view of an airbag arrangement with an airbag 1 of the type described in FIGS. 2 and 3 which, when folded up according to FIG. 6, extends longitudinally along a roof strut 26 of a motor vehicle body. The roof strut 26 connects a B-pillar 27 stretched along the vertical vehicle axis z and an A-pillar 28 which is stretched along the vertical vehicle axis z and lies opposite the B-pillar along the vehicle longitudinal axis x. The roof strut 26 and the B- and A-pillars 27, 28 surround a window (not shown) of a side motor vehicle door in front of which the airbag 1, when inflated, extends between the window and a person in order to protect that person.

To release the gas required to inflate the airbag 1, a gas generator 29 can be provided which extends longitudinally along the B-pillar and is fastened thereto by means of two holding elements H. The gas generator 29 can be connected to the covering 2 of the airbag 1 via a gas-conducting pipe 17 likewise stretched along the B-pillar in a direction of extent E, so that the gas produced by the gas generator 29 can be transported to the airbag 1.

For this purpose, the gas-conducting pipe 17, which can have an essentially cylindrical shape, can be placed by a free end region, on which an outflow opening 30 is located, into the contact region 16 which tightly encloses the free end region of the gas-conducting pipe 17. Fixed to a free end of the gas-conducting pipe 17, adjacent to the outflow opening 30, can be an essentially L-shaped profile 17a, with a covering surface 17b which lies opposite the outflow opening 30 along the direction of extent E and ensures that no part of an airbag layer can enter the outflow opening 30.

So that the contact region 16 bears against the free end region of the gas-conducting pipe 17 in as gas-tight a manner as possible, the gas-conducting pipe 17 can have, at its free end region, a closed sealing ring 31 which runs along the circumferential direction U of the gas-conducting pipe 17 and can be pushed on or else can be a sealing ring 31 or web integrally formed on the gas-conducting pipe 17. The contact region 16 of the covering 2 of the airbag 1, which contact region is pulled onto the free end region of the gas-conducting pipe 17, can be pressed against this sealing ring 31 by a clip-like element 32 or other similar device engaging around the gas-conducting pipe 17, so that a sealing region 33 of the contact region 16 is formed, with the sealing region encircling the gas-conducting pipe 17 in a circumferential direction U and preventing gas from being able to escape out of the covering 2 along the gas-conducting pipe 17 or the contact region 16 when the airbag 1 is inflated.

The priority application, German priority application No. 102005047703.8, filed on Sep. 27, 2005, is hereby incorporated by reference herein in its entirety.

Embodiments described herein have been explained with reference to an airbag that is essentially composed of two airbag layers. Of course, it is also conceivable to form the airbag from a smaller or greater number of airbag layers. Furthermore, with appropriate configuration of the individual parts of the airbag arrangement, the airbag can be designed, for example, as a side airbag (SAB), a head side airbag (HSAB) or else a driver's airbag (for example for arrangement in a steering wheel of a motor vehicle).

Given the disclosure of the embodiments herein, one versed in the art would appreciate that there may be other embodiments and modifications within the scope and spirit of the described embodiments. Accordingly, all modifications attainable by one versed in the art from the present disclosure within the scope and spirit of the present invention are to be included as further embodiments.

What is claimed is:

1. An airbag for a motor vehicle that can be inflated to protect a vehicle occupant, comprising:
    a covering that forms a gas-tight interior space that can be filled with gas, wherein the covering comprises an inflow opening;
    a contact region that is configured to contact a gas-conducting pipe that conducts gas through the inflow opening and into the gas-tight interior space to inflate the airbag, wherein the contact region surrounds the inflow opening and encloses the gas-conducting pipe in a sealing manner along a circumferential direction of the gas-conducting pipe; and
    a protective layer that is arranged to protect the covering from hot gas that fills the interior space of the covering, wherein the protective layer comprises at least one fastening region that connects the protective layer to the covering, wherein the at least one fastening region is connected to the contact region;
    wherein the covering includes a U-shaped cutout that is bounded by an inner encircling edge of the covering;
    wherein the contact region that is configured to contact the gas-conducting pipe extends vertically downwards into an interior portion of the cutout, wherein the contact region is configured to engage with a vertically arranged gas-conducting pipe so that a longitudinal axis of the gas-conducting pipe is arranged in a vertical direction of the vehicle.

2. The airbag as claimed in claim 1, wherein the contact region comprises a sealing region which encloses the gas-conducting pipe in a sealing manner in the circumferential direction;
    wherein the sealing region divides the covering of the airbag into the gas-tight interior space and a gas-permeable part, wherein the at least one fastening region is connected to the gas-permeable part;
    wherein the gas-permeable part is located between the inflow opening and the gas-tight part.

3. The airbag as claimed in claim 2, wherein the at least one fastening region of the protective layer is fastened to the contact region along a direction of extent between the inflow opening and the sealing region.

4. The airbag as claimed in claim 1, wherein the at least one fastening region is configured for fastening the covering to a motor vehicle part.

5. The airbag as claimed in claim 1, wherein the covering is formed from at least one first and one second airbag layer.

6. The airbag as claimed in claim 5, wherein the first and the second airbag layer each have a panel cutout to form the U-shaped cutout, wherein the two panel cutouts are congruent.

7. The airbag as claimed in claim 5, wherein the panel cutout of the first airbag layer is bounded by an inner encircling edge of the first airbag layer, and wherein the panel cutout of the second airbag layer is bounded by an inner encircling edge of the second airbag layer;
wherein the first and second airbag layers are connected to each other along inner encircling edges of the first and second airbag layers to form the covering.

8. The airbag as claimed in claim 5, further comprising a first edge region protruding from the first airbag layer along the direction of extent and a second edge region protruding from the second airbag layer along a direction of extent, wherein the two edge regions are connected to each other to form the contact region of the covering.

9. The airbag as claimed in claim 8, wherein the first edge region is an inner encircling edge of the first airbag layer, and wherein the second edge region is an inner encircling edge of the second airbag layer.

10. The airbag as claimed in claim 5, wherein the protective layer is arranged in the gas-tight interior space of the covering at a distance from a connection connecting the first airbag layer to the second airbag layer.

11. The airbag as claimed in claim 10, wherein the connection comprises an inner seam which connects the two airbag layers to each other along their two inner encircling edges.

12. The airbag as claimed in claim 11, wherein the inner seam is sealed at a distance from the at least one fastening region by an inner seal running along the seam.

13. The airbag as claimed in claim 10, wherein the at least one fastening region of the protective layer is fixed to the contact region of the covering by means of the connection.

14. The airbag as claimed in claim 1, wherein the protective layer is fixed to an inside of the covering, which faces the gas-tight interior space of the covering, by an adhesive connection.

15. The airbag as claimed in claim 1, wherein the protective layer widens transversely with respect to a direction that the contact region extends in.

16. The airbag as claimed in claim 1, wherein the at least one fastening region protrudes from a free end of the contact region beyond the inflow opening and is arranged outside a part of the covering that can be filled with gas.

17. The airbag as claimed in claim 1, wherein the protective layer is connected to the covering at a distance from the contact region, wherein the protective layer is a single-sided layer.

18. The airbag as claimed in claim 1, wherein the at least one fastening region is connected to the covering by a seam, wherein the seam is formed by edge regions of a plurality of airbag layers.

19. An airbag module, comprising:
a gas generator;
a gas-conducting pipe that conducts gas produced by the gas generator to an airbag;
wherein the airbag includes:
a covering that forms a gas-tight interior space that can be filled with the gas, wherein the covering includes an inflow opening for receiving the gas produced by the gas generator into the gas-tight interior space; and
a contact region that is configured to contact the gas-conducting pipe, wherein the contact region surrounds the inflow opening and encloses the gas-conducting pipe in a sealing manner along a circumferential direction of the gas-conducting pipe; and
a protective layer that is arranged to protect the covering from hot gas that fills the gas-tight interior space of the covering, wherein the protective layer comprises at least one fastening region that connects the protective layer to the covering, wherein the at least one fastening region is connected to the contact region;
wherein the covering includes a U-shaped cutout that is bounded by an inner encircling edge of the covering:
wherein the contact region that is configured to contact the gas-conducting pipe extends vertically downwards into an interior portion of the cutout, wherein the contact region is configured to engage with a vertically arranged gas-conducting pipe so that a longitudinal axis of the gas-conducting pipe is arranged in a vertical direction of the vehicle.

20. An airbag for a motor vehicle that can be inflated to protect a vehicle occupant, comprising:
a covering that forms an interior space that can be filled with gas, wherein the covering comprises an inflow opening;
a contact region that is configured to contact a gas-conducting pipe that conducts gas through the inflow opening and into the interior space to inflate the airbag, wherein the contact region surrounds the inflow opening and encloses the gas-conducting pipe in a sealing manner along a circumferential direction of the gas-conducting pipe; and
a protective layer that is arranged to protect the covering from hot gas that fills the interior space of the covering, wherein the protective layer comprises at least one fastening region that connects the protective layer to the covering, wherein the at least one fastening region is connected to the contact region;
wherein the contact region comprises a sealing region which encloses the gas-conducting pipe in a sealing manner in the circumferential direction;
wherein the sealing region divides the covering of the airbag into a gas-tight part and a gas-permeable part, wherein the at least one fastening region is connected to the gas-permeable part; and
wherein the at least one fastening region of the protective layer is fastened to the contact region along a direction of extent between the inflow opening and the sealing region;
wherein the covering includes a U-shaped cutout that is bounded by an inner encircling edge of the covering;
wherein the contact region that is configured to contact the gas-conducting pipe extends vertically downwards into an interior portion of the cutout, wherein the contact region is configured to engage with a vertically arranged gas-conducting pipe so that a longitudinal axis of the gas-conducting pipe is arranged in a vertical direction of the vehicle.

* * * * *